United States Patent [19]

Whittam

[11] 4,018,870

[45] Apr. 19, 1977

[54] PREPARATION OF SYNTHETIC ZEOLITE MOLECULAR SIEVES

[75] Inventor: Thomas Vincent Whittam, Stockton-on-Tees, England.

[73] Assignee: Imperial Chemical Industries Limited, London, England

[22] Filed: Jan. 27, 1975

[21] Appl. No.: 544,671

[30] Foreign Application Priority Data

Jan. 30, 1974 United Kingdom ............... 4274/74

[52] U.S. Cl. ................................ 423/329; 423/328
[51] Int. Cl.² .......................................... C01B 33/28
[58] Field of Search .......... 423/429, 428, 430, 118; 252/455 Z; 260/448 C

[56] References Cited

UNITED STATES PATENTS

| | | | |
|---|---|---|---|
| 3,459,676 | 8/1969 | Kerr | 423/329 X |
| 3,692,470 | 9/1972 | Ciric | 423/328 |
| 3,699,139 | 10/1972 | Rubin et al. | 260/448 C |

OTHER PUBLICATIONS

Kuhl, "Molecular Sieve Zeolites–I," ACS, Advances in Chemistry Series 101, 1971, pp. 63–75.

*Primary Examiner*—Edward J. Meros
*Attorney, Agent, or Firm*—Cushman, Darby & Cushman

[57] ABSTRACT

In the manufacture of synthetic zeolites, the formation of unwanted, contaminating zeolites is inhibited by the addition to the reactant mixture of a basic nitrogen-containing dye, and makes it possible to synthesize new zeolites AG5 and AG6 herein defined by their compositions and X-ray diffraction patterns.

8 Claims, No Drawings

PREPARATION OF SYNTHETIC ZEOLITE MOLECULAR SIEVES

The present invention relates to improvements in or relating to the manufacture of synthetic zeolite molecular sieves, and in particular to the use of basic dyes containing nitrogen, to inhibit the formation of specific unwanted zeolitic phases, and as a result promote the formation of desired zeolite phases.

Surprisingly we have found that certain basic dyes (and salts and esters thereof) adsorb very strongly on specific zeolites, or only on zeolites having related framework structures. If such a basic dye (or dyes) is employed, as recommended in this invention, this property can be used to suppress the formation of unwanted zeolite products during the manufacture of more desirable products. It is believed that the basic dye or dyes adsorb on nuclei of unwanted species and inhibit nucleation and subsequent crystal growth. The net result of this discovery is that it is now possible to manufacture desired zeolite products under more advantageous operating conditions, which could not be employed in the absence of said basic dyes. Also we have found that it is possible to inhibit the formation of known zeolitic products and to promote the formation of novel zeolites AG5 and AG6. Examples of some basic dyes suitable for this invention are shown in Table 1, but this table in no way limits the scope of our invention.

The present invention provides a process for the manufacture of synthetic zeolites, wherein the normal reaction of the reactant mixture is altered by the addition thereto of an additive comprising a basic dye or mixture of dyes containing, nitrogen (or salts or esters of such dyes), the additive: $Al_2O_3$ molar ratio being less than 0.1:1.

Such a basic dye containing nitrogen is one which promotes the formation of unwanted zeolite products. A suitable additive is a basic dye (or mixture of dyes) which adsorbs strongly on unwanted zeolite products.

TABLE 1

| | ADSORPTION ON ZEOLITES | |
|---|---|---|
| ZEOLITE | STRONG ADSORPTION | MEDIUM STRONG ADSORPTION |
| B (near gismondite) | crystal violet nuclear fast red | methyl violet methylene blue |
| R (near chabazite -sodium) | toluidene blue methylene blue | |
| D (near chabazite potassium-sodium) | toluidene blue methylene blue | |
| KM (potassium near phillipsite) | malachite green nuclear fast red | magenta crystal violet methyl violet methylene blue |
| F | | methylene blue malachite green |
| A | | acriflavine |
| X, Y, Y¹ | | acriflavine |

In the manufacture of the faujasite-type zeolites commonly designated zeolites X, Y and Y¹, and of zeolite L, the prior art routes require, especially for commercial scale manufacture, that the reactants should be mixed and aged quiescently at ambient temperature, and then heated rapidly to a crystallization temperature of, for example, 100° C. Zeolite Y¹ is a higher silica modification of zeolite Y; both zeolites Y and Y¹ are treated as identical in the U.S. Pat. No. 3,130,007, while British Patent Specifications Nos. 909,266 and 972,831 distinguish between the Y and Y¹ form, respectively. This temperature is maintained for from 48 to 120 hours, and quiescent conditions are of vital importance, ie the reactants must undergo no significant mechanical agitation, and there must be no significant thermal gradients across the reaction mixture. Such conditions are, of course, extremely difficult to maintain in large scale commercial processes.

Alternatively, for the manufacture of zeolite X, Y and Y¹, the need for quiescent ageing and quiescent crystallization can be avoided by the use of active silicates, as in British Pat. No. 1,145,995, in which process ambient ageing stages are unnecessary and crystallization need not be quiescent. The limitations of the process of British Pat. No. 1,145,995 are that active silicates are essential, and that for synthetic faujasites having $SiO_2/Al_2O_3$ ratio >4 it is necessary to use expensive colloidal silica or fume silica as the major silica source in those manufacturing ranges which are economical in raw material usage. Where the $SiO_2/Al_2O_3$ ratio of the reaction mixture is ≤ 14, even with colloidal silica the reactions are unreliable and liable to give high levels of contamination with an undesirable small-port zeolite S.

In our co-pending British Patent application No. 4130/73, now British Patent Specification No. 1,450,411, (corresponding to U.S. application Ser. No: 435,507 filed 22 Jan. 1974, now abandoned) we have shown that it is possible to manufacture highly crystalline potassium or sodium/potassium faujasite under conditions which combine the advantage of easy manufacturing conditions with the use of cheaper raw materials, namely the replacement of colloidal or fume silica as the major source of silica by common water glass or other low-cost forms of silica, eg precipitated silica. A minor source of silica, necessary for the process of our said co-pending British Pat. Appln. 4130/73, is an active hydrated sodium metasilicate or active silica (as in British Pat. Nos. 1,145,995 and 1,193,254). For the purposes of our said co-pending British application No. 4130/73, an active silica(te) is defined as a source of silica, which must yield substantially pure synthetic faujasite within 17 hours at 85° in a vigorously agitated reaction, and wherein the reaction mixture molar ratios are: $SiO_2/Al_2O_3 = 6.4$, $Na_2O/SiO_2 = 0.35$, $H_2O/Na_2O = 50$, $SO_4/Al_2O_3 = 1.5$. The sulphate is introduced as aluminium sulphate, and the remainder of the alumina as sodium aluminate. The ratio of active silica(te) to silica(te) from other sources is 1:3.6. While the process of our said co-pending British application No. 4130/73 yields zeolite Y or Y¹ of high purity, it has some limitations. It is essential that a minor part of the silica(te) should be in active form; also, as in the prior art processes, synthetic faujasites, when formed, may recrystallize to yield zeolite B if left in contact with the mother liquor for too long. Attempts to reduce reaction times by raising the temperature are ultimately limited by this conversion of Y or Y¹ to zeolite B, because before all of the reaction mixture has been crystallized as zeolite Y or Y¹, some of the product recrystallizes as zeolite B giving rise to high levels of contamination.

Similarly, in the process of our said co-pending British Patent application No. 4130/73, as in the prior art processes, attempts to reduce reaction time by seeding with pure zeolite Y or Y¹ would fail, because some of the added seed is converted to zeolite B, which in turn promotes formation of more zeolite B. Examples of the effects of this over-run problem are given in Table 2.

TABLE 2

MANUFACTURE OF ZEOLITE Y ($SiO_2/Al_2O_3 = 4.9$)

| METHOD USED | REACTION TIME HOURS | CRYSTALLIZATION TEMPERATURE °C | PRODUCT |
|---|---|---|---|
| As in US Patent 3,130,007 | 40* | 95 | 95% zeolite Y + zeolite S |
| | 26* | 103 | 70% zeolite Y + amorphous |
| | 27* | 103 | 80% zeolite Y + 20% zeolite B |
| | 12△ | 103 | 60% zeolite Y 30% zeolite B 10% amorphous |
| As in our said Co-pending British Applicaton No.: 4130/73 | 24–28 | 85 | 100% zeolite Y |
| | 16½ | 95 | 80% zeolite Y + amorphous |
| | 17 | 95 | 100% zeolite Y |
| | 17½ | 95 | 80% zeolite Y + 20% zeolite B |

*Also aged 28 hours at 25° C
△20% seed added, no preaging

We have now found that if a suitable basic dye containing nitrogen is introduced into a zeolite reaction, preferably along with the siliceous components, then synthetic faujasites with $SiO_2/Al_2O_3 = 2.3$ to 6.3 can be prepared under highly advantageous conditions. Suitable dyes are, for example, crystal violet, methyl violet, and nuclear fast red. The advantages result (a) from the suppression of zeolite B formation, ie there are none of the over-run problems which occur in prior art routes; (b) from the fact that any hydrated sodium metasilicate can be employed as a minor source of silica, and its activity is of no significance; (c) the reaction time can be reduced substantially by either raising the temperature, or by adding zeolite seeds, or both. Typical results obtained by the process of this invention are given in Table 3, and are compared with results obtained by the process of this invention are given in Table 3, and are compared with results obtained in the absence of added organic components. The operating range for zeolite X manufacture in the temperature range 50° C to 120° C is as follows, on a molar basis: wherein $M_2O = Na_2O + K_2O$ $SiO_2/Al_2O_3 = 2.7$ to 8
$M_2O/SiO_2 = 0.3$ to 6.0
$Na_2O/M_2O = 0.7$ to 1.0
sodium metasilicate hydrate / $Al_2O_3 = 0.3$ to 6.0
$H_2O/M_2O = 10$ to 150
basic dye, eg crystal violet / $Al_2O_3 = 5 \times 10^{-4}$ to 0.1.

The operating ranges for zeolite Y and $Y^1$, at from 75° C to 120° C, are as follows:

| Range | $SiO_2/Al_2O_3$ | $M_2O/SiO_2$ | $Na_2O/M_2O$ | $H_2O/M_2O$ | $A_2/n/Al_2O_3$ | Basic dye additive/$Al_2O_3$ |
|---|---|---|---|---|---|---|
| 1 | 4 to 6.9 | 0.25 to 0.4 | 0.7 to 1.0 | 40 to 120 | 0 to 3.0 | $5\times10^{-4}$ to 0.1 |
| 2 | 6.9 to 7.9 | 0.25 to 0.335 | " | " | " | " |
| 3 | 7.9 to 10 | 0.25 to 0.34 | " | " | " | " |
| 4 | 10 to 12 | 0.25 to 0.40 | " | " | " | " |
| 5 | 12 to 14 | 0.25 to 0.45 | " | " | " | " |
| 6 | 14 to 16 | 0.25 to 0.50 | " | " | " | " |
| 7 | 16 to 40 | 0.25 to 1.0 | " | " | " | " | wherein $M_2O = Na_2O + K_2O$, and A = an acid radical of valence $n$, for example sulphate, nitrate or chloride introduced as the aluminium salt or salts. Also the ratio of hydrated sodium metasilicate to silica from other sources is preferably at least 1:8.

TABLE 3 SYNTHETIC FAUJASITES

| Ex. No | REACTANT MOLAR RATIOS | | | | | | Ratio inactive hydrated metasilicate to other silica | REACTION | | |
|---|---|---|---|---|---|---|---|---|---|---|
| | $SiO_2/Al_2O_3$ | $M_2O/SiO_2$ | $An/2/Al_2O_3$* | $H_2O/M_2O$ | Basic dye additive/$Al_2O_3$ | Basic dye additive | | Time hours | Temp °C | Product |
| 1 | 3.85 | 1 | 1.2 | 47 | 0 | None | 0.125 | 3 | 95 | zeolite B + zeolite C + amorphous |
| 2 | 3.85 | 1 | 1.2 | 47 | $5 \times 10^{-3}$ | crystal violet | 0.125 | 3 | 95 | zeolite X |
| 3 | 5 | 0.7 | 25 | 47 | $5 \times 10^{-3}$ | methyl violet | 0 | 24 | 95 | zeolite X |
| 4 | 20 | 1 | 0.4 | 40 | 0 | none | 0.6 | 24 | 95 | zeolite S + zeolite B + amorphous |
| 5 | 20 | 1 | 0.4 | 40 | $5 \times 10^{-3}$ | nuclear fast red | 0.6 | 24 | 95 | zeolite $Y^1$ |
| 6 | 6.86 | 1.0 | 0.32 | 63 | $5 \times 10^{-3}$ | crystal violet | 0.25 | 24 | 85 | zeolite $Y/Y^1$ |

TABLE 3 SYNTHETIC FAUJASITES-continued

| Ex. No | REACTANT MOLAR RATIOS | | | | | | Ratio inactive hydrated metasilicate to other silica | REACTION | | |
|---|---|---|---|---|---|---|---|---|---|---|
| | $SiO_2/Al_2O_3$ | $M_2O/SiO_2$ | $An/2/Al_2O_3$* | $H_2O/M_2O$ | Basic dye additive/$Al_2O_3$ | Basic dye additive | | Time hours | Temp °C | Product |
| 7 | As in Example 6 | | | | 0 | none | 0.25 | 14 | 103 | zeolite Y/Y$^1$ |
| 8 | | | | | 0 | none | 0.25 | 14.5 | 103 | 80% zeolite Y/Y$^1$ 20% zeolite B |
| 9 | | | | | $5 \times 10^{-3}$ | methyl violet | 0.25 | 14 to 24 | 103 | zeolite Y/Y$^1$ |
| 10 | | | | | $5 \times 10^{-4}$ | methyl violet | 0.25 | 14 to 16 | 103 | zeolite Y/Y$^1$ |
| 11 | | | | | 0 | 20% zeolite Y seed | 0.25 | 7 | 103 | 50% zeolite Y 30% zeolite B + amorphous |
| 12 | | | | | $5 \times 10^{-3}$ | crystal violet and 20% zeolite Y seed | 0.25 | 7 | 103 | zeolite Y/Y$^1$ |

*An acid radical of valence n, preferably $SO_4^{--}$, but possibly $NC_3^-$ or $Cl^-$ In the same manner, it is possible to manufacture zeolite L and the related zeolites, such as AG4 (disclosed in our co-pending British Patent Appln. No. 5492/72, now British Patent Specification No. 1,394,163 which corresponds to U.S. Application Serial No. 329,336 filed 5 May 1973, now abandoned) and a novel zeolite AG5 under advantageous conditions. Thus, in the prior art synthesis of zeolite L, there is always a tendency for the formation of unwanted zeolite KM, a small-port near-phillipsite; this can result from inadequate preageing of the reaction mixture at ambient temperature, or can result from agitation, either mechanical or resulting from thermal gradients, because quiescent crystallization is an essential feature of the manufacture and, especially on a commercial scale, true quiescent conditions are extremely difficult to maintain. Over-run problems occur in zeolite L synthesis, as with zeolites Y and Y$^1$, the unwanted conversion products being zeolite KM or, in some cases, zeolite D.

We have found that malachite green, magenta, crystal violet, methyl violet and nuclear fast red adsorb strongly on zeolite KM, and can be used to suppress the formation of this zeolite. A further advantage found is that with the basic dye added to the reaction mixture, amibent ageing stages are unnecessary and, futhermore, agitation is preferable, ie problems relating to disturbance from mixing and by thermal agitation became non-existent. Typical results are given in Table 4. Where a basic dye additive was incorporated, crystallization under agitated conditions yielded zeolites L or AG4 or AG5, instead of the expected zeolite KM. Non-agitated reactions yielded near-chabazites along with near L-type zeolites. A further advantage over the prior art synthesis is that cheap sources of silica, eg water glass, can be employed instead of expensive colloidal or fume silica.

Zeolite AG4 is a large-port L-type disclosed in our said co-pending British Patent Application No. 5492/72, and it can be readily distinguished from zeolite L by its ability to adsorb up to about 20% of perfluorotributylamine (PFTB) at P/po = 0.6 within 4 hours, whereas zeolite L adsorbs <1% under such conditions. This demonstrates that zeolite AG4 has ports of about 11.0A, as compared with zeolite L which has ports of about 9A. The novel zeolite AG5 is a small-port near L-type zeolite which as ports of about 6.5A, as indicated by its refusal of cumene (6.9A) and adsorption of 8% cyclohexane (6A) at P/po = 0.6 for 1 hour (under these conditions zeolite AG4 and zeolite L adsorb >8% cumene).

TABLE 4

ZEOLITES L, AG4 and AG5

| Example No | Type of silicate used | REACTION RATIOS | | | | Basic dye additive/$Al_2O_3$ | REACTION | | |
|---|---|---|---|---|---|---|---|---|---|
| | | $SiO_2/Al_2O_3$ | *$K_2O/M_2O$ | *$M_2O/SiO_2$ | *$H_2O/M_2O$ | | Time hours | Temp °C | Product |
| 13 | Potassium waterglass $SiO_2/K_2O$=2.24 | 14 | 1.0 | 0.55 | 100 | $5 \times 10^{-3}$ (crystal violet) | 48 | 95 | zeolite AG5 |
| 14 | As Example 13 | 14 | 1.0 | 0.55 | 100 | None | 48 | 95 | zeolite KM |
| 15 | colloidal silica | 20 | 1.0 | 0.65 | 80 | $5 \times 10^{-3}$ (crystal violet) | 72 | 95 | zeolite AG5 |
| 16 | potassium waterglass $SiO_2/K_2O$=3.2 | 20 | 0.64 | 0.425 | 37.5 | $5 \times 10^{-3}$ (methyl violet) | 48 | 95 | zeolite AG4 |
| 17 | colloidal silica | 7 | 0.64 | 0.8 | 70 | $5 \times 10^{-3}$ (nuclear fast red) | 24 | 95 | zeolite AG4 |
| 18 | potassium waterglass $SiO_2/K_2O$=3.2 | 28 | 0.58 | 0.452 | 32 | $5 \times 10^{-3}$ crystal violet | 54 | 95 | zeolite L |
| 19 | colloidal silica | 20 | 0.3 | 0.3 | 40 | $5 \times 10^{-3}$ (malachite green) | 96 | 95 | zeolite L |

*$M_2O = K_2O + Na_2O$

TABLE 5

X-ray diffractometer results

| ZEOLITE AG5 | | ZEOLITE AG4 | | ZEOLITE L | |
|---|---|---|---|---|---|
| dA | 100I/I₀ | dA | 100I/I₀ | dA | 100I/I₀ |
| 16.0 | 100 | 15.85 | 100 | 15.8 | 100 |
| 7.8 | 22 | | | 7.89 | 8 |
| | | 7.50 | 26 | 7.49 | 14 |
| 6.25 | 22 | | | | |
| 6.00 | 15.5 | 6.00 | 32 | 5.98 | 20 |
| 4.79 | 62 | | | | |
| 4.60 | 67 | 4.57 | 66 | 4.57 | 30 |
| | | 4.40 | 26 | 4.40 | 7 |
| 4.15 | 78 | | | | |
| 3.87 | 37 | 3.91 | 77 | 3.91 | 35 |
| | | | | 3.78 | 10 |
| 3.66 | 37 | 3.66 | 32 | 3.66 | 18 |
| 3.42 | 70 | 3.46 | 55 | 3.48 | 25 |
| 3.25 | 53 | | | 3.26 | 25 |
| 3.17 | 50 | | | | |
| 3.10 | 80 | 3.06 | 72 | 3.03 | 27 |
| | | | | 3.02 | 12 |
| | | 2.91 | 58 | 2.91 | 25 |
| 2.80 | 61 | | | | |
| 2.68 | 14 | 2.65 | 47 | 2.65 | 16 |
| 2.60 | 11 | | | 2.62 | 6 |
| 2.57 | 9 | | | | |
| | | 2.49 | 11 | 2.45 | 11 |
| | | | | 2.42 | 21 |
| 2.32 | 27 | | | | |
| 2.17 | 30 | 2.19 | 13 | 2.19 | 9 |

X-ray diffraction data given in Table 5 illustrate that there are small but significant differences between zeolites L, AG4 and AG5.

The operating range for zeolite L, from 50° C to 120° C is for agitated reactions only, and is as follows:
$SiO_2/Al_2O_3 = 20$ to 28
$M_2O/SiO_2 = 0.3$ to 0.6
$K_2O/M_2O = 0.26$ to 1.0
$H_2O/M_2O = 10$ to 90
(basic dye)/$Al_2O_3 = 5 \times 10^{-4}$ to 0.1
wherein $M_2O = K_2O + Na_2O$ The operating range for zeolite AG4, in agitated reaction only, at 50° C to 120° C is
$SiO_2/Al_2O_3 = 7$ to 20
$M_2O/SiO_2 = 0.4$ to 0.9
$K_2O/M_2O = 0.5$ to 0.95
$H_2O/M_2O = 10$ to 80
(basic dye)$Al_2O_3 = 5 \times 10^{-4}$ to 0.1
wherein $M_2O = K_2O + Na_2O$ The operating range for novel zeolite AG5, in agitated reaction only, at 50° C to 120° C is
$SiO_2/Al_2O_3 = 7$ to 20
$K_2O/SiO_2 = 0.45$ to 0.65
$H_2O/K_2O = 80$ to 140
(basic dye)$Al_2O_3 = 5 \times 10^{-4}$ to 0.1

The invention therefore also provides a process for preparing the novel zeolite AG5 from a reactant composition according to the immediately preceding paragraph.

The novel zeolite AG5 has a composition in the following range, and its cations are exchangeable:
0.7 to 1.1 $K_2O.Al_2O_3.2.5$ to $6.0SiO_2.yH_2O$,
where y is 0 to 8.

The invention therefore also provides the novel zeolite AG5 having a composition according to the immediately preceding paragraph and an X-ray diffraction pattern substantially as shown in Table 5.

The experiments given below in Table 6 further illustrate the utility of this invention. In the field of synthesis normally yielding either zeolite F or zeolite D, the addition of both malachite green and methylene blue suppresses the formation of both zeolites, and allows formation of a novel zeolite AG6 (see Table 6). X-ray diffraction data is given in Table 7 for the novel zeolite AG6.

This novel zeolite AG6 has a composition in the following range, and its cations are exchangeable:
0.7 to 1.1 (x $K_2O$. (1−x) $Na_2O$) $Al_2O_3.2.5$ to 6.0 $SiO_2.y H_2O$,
wherein x is 0.2 to 0.8, and y is 0 to 8.

The invention therefore further provides the novel zeolite AG6 having a composition according to the immediately preceding paragraph and an X-ray diffraction pattern substantially as shown in Table 7.

The operating range for the manufacture of zeolite AG6, in the temperature range 50° C to 120° C is as follows, ambient ageing being unnecessary, and agitation being optional:
$SiO_2/Al_2O_3 = 1$ to 10
$K_2O/Na_2O + K_2O = 0.4$ to 0.9
$M_2O/SiO_2 = 0.4$ to 4.0
$H_2O/M_2O = 10$ to 50
(basic dye($Al_2O_3 = 5 \times 10^{-4}$ to 0.1
wherein $M_2O = K_2O + Na_2O$ The invention therefore further provides a process for preparing the novel zeolite AG6 from a reactant composition according to the immediately preceding paragraph.

TABLE 6

| EXAMPLE NUMBER | REACTION MIXTURE MOLAR RATIOS | | | | | REACTION | |
|---|---|---|---|---|---|---|---|
| | $SiO_2/Al_2O_3$ | $K_2O/Na_2O+K_2O$ | $M_2O/SiO_2$ | $H_2O/M_2O$ | basic dye additive/$Al_2O_3$ | Time hours | Product |
| 20 | 5 | 0.8 | 2.8 | 13 | 0 | 24 | zeolite F |
| 21 | 5 | 0.8 | 2.8 | 13 | $5 \times 10^{-3+}$ | 24 | zeolite AG6 |
| 22 | 5 | 0.4 | 2.5 | 20 | $5 \times 10^{-3+}$ | 36 | zeolite AG6 |
| 23 | 5 | 0.4 | 2.5 | 20 | 0 | 36 | zeolite D |

+equal (molar) quantities of malachite green and methylene blue

TABLE 7

| ZEOLITE 6 - X-RAY DIFFRACTION DATA | | | | | | | |
|---|---|---|---|---|---|---|---|
| dA | 9.36 | 7.05 | 6.24 | 5.42 | 3.116 | 2.978 | 2.618 |
| 100I/I₀ | 100 | 20 | 35 | 25 | 30 | 70 | 20 |

I claim:

1. In a process for the manufacture of synthetic zeolites, comprising crystallizing the zeolite from a reaction mixture, the improvement comprising altering the reaction mixture by the addition thereto of an additive selected from the group consisting of crystal violet, methyl violet, nuclear fast red, methylene blue, toluidene blue, malachite green, magenta, acriflavine, and mixtures, salts and esters thereof.

2. Process as claimed in claim 1, in which the silica source includes hydrated sodium metasilicate and the ratio of such silica source to other silica sources in the reactant mixture is at least 1:8.

3. Process as claimed in claim 1, for producing zeolite L, which comprises reacting, under agitated conditions and at a temperature between 50° C and 120° C, a reactant mixture having a molar composition in the range:

$SiO_2/Al_2O_3$ = 20 to 28
$M_2O/SiO_2$ = 0.3 to 0.6
$K_2O/M_2O$ = 0.26 to 1.0
$H_2O/M_2O$ = 10 to 90
(basic dye)/$Al_2O_3$ = 5 × $10^{-4}$ to 0.1
wherein $M_2O = K_2O + Na_2O$ 4. Process as claimed in claim 1, for producing zeolite AG4, which comprises reacting, under agitated conditions and at a temperature between 50° C and 120° C, a reactant mixture having a molar composition in the range:

$SiO_2/Al_2O_3$ = 7 to 20
$M_2O/SiO_2$ = 0.4 to 0.9
$K_2O/M_2O$ = 0.5 to 0.95
$H_2O/M_2O$ = 10 to 80
(basic dye)/$Al_2O_3$ = 5 × $10^{-4}$ to 0.1
wherein $M_2O = K_2O + Na_2O$ 5. A method of crystallizing zeolite AG5 having the composition 0.7 to 1.1 $K_2O$ . $Al_2O_3$ . 2.5 to 6.0 $SiO_2$ . 0 to 8 $H_2O$ and the following X ray diffraction pattern:

| dA | $100I/I_o$ |
|---|---|
| 16.0 | 100 |
| 7.8 | 22 |
| 6.25 | 22 |
| 6.00 | 15.5 |
| 4.79 | 62 |
| 4.60 | 67 |
| 4.15 | 78 |
| 3.87 | 37 |
| 3.66 | 37 |
| 3.42 | 70 |
| 3.25 | 53 |
| 3.17 | 50 |
| 3.10 | 80 |
| 2.80 | 61 |
| 2.68 | 14 |
| 2.60 | 11 |
| 2.57 | 9 |
| 2.32 | 27 |
| 2.17 | 30 | which comprises reacting together at 50°–120° C a silica source and an alumina source in a potassium-containing aqueous alkaline medium in the presence of at least one basic dye selected from the group consisting of malachite green, magenta, crystal violet, methyl violet and nuclear fast red, the molar ratio of the constituents of the mixture being represented by $SiO_2/Al_2O_3$ = 7 to 20
$K_2O/K_2$ = 0.45 to 0.65
$H_2O/K_2O$ = 80 to 140
(Basic dye)/$Al_2O_3$ = 5 × $10^{-4}$ to 0.1

6. A method of crystallizing zeolite Y or $Y^1$ which comprises reacting together at 75°–120° C. a silica source and an alumina source in an aqueous alkaline medium containing sodium ions or sodium ions and potassium ions in the presence of at least one basic dye selected from the group consisting of malachite green, magenta, crystal violet, methyl violet, nuclear fast red, toluidine blue and methylene blue, the molar ratio of basic dye to alumina being in the range of 5 × $10^{-4}$ to 0.1 and the molar composition of the mixture including $SiO_2/Al_2O_3$ and $M_2O/SiO_2$ which are selected in combination from

| $SiO_2/Al_2O_3$ | $M_2O/SiO_2$ |
|---|---|
| 4 to 6.9 | 0.25 to 0.4; |
| 6.9 to 7.9 | 0.25 to 0.335; |
| 7.9 to 10 | 0.25 to 0.34; |
| 10 to 12 | 0.25 to 0.40; |
| 12 to 14 | 0.25 to 0.45; |
| 14 to 16 | 0.25 to 0.50; or |
| 15 to 40 | 0.25 to 1.0, | and further including (b)

$Na_2O/M_2O$ = 0.7 to 1.0
$H_2O/M_2O$ = 40 to 120
$A_{2/n}/Al_2O_3$ = 0 to 3 to produce zeolite Y or $Y^1$, where $M_2O = Na_2O + K_2O$ and A is an acid radical of valence n.

7. A method of crystallizing zeolite X which comprises reacting together at 50°–120° C a silica source and an alumina source in an aqueous alkaline medium containing sodium ions or sodium ions and potassium ions in the presence of at least one basic dye selected from the group consisting of malachite green, magenta, crystal violet, methyl violet, nuclear fast red, toluidine blue and methylene blue, the molar ratio of basic dye to alumina being in the range 5 × $10^{-4}$ to 0.1 and the molar composition of the mixture being represented by $SiO_2/Al_2O_3$ = 2.7 to 8
sodium metasilicate hydrate/$Al_2O_3$ = 0.3 to 6.0
$M_2O/SiO_2$ = 0.3 to 6.0
$Na_2O/M_2O$ = 0.7 to 1.0
$N_2O/M_2O$ = 10 to 150 where $M_2O = Na_2O + K_2O$ to produce zeolite X.

8. A method of crystallizing zeolite AG6 having the composition 0.7 to 1.1 $(xK_2O.(1-x)Na_2O_3.2.5$ to 6.0 $SiO_2$ to 8 $H_2O$ wherein x is 0.2 to 0.8, and the following X-ray diffraction pattern:

| dA | $100I/I_o$ |
|---|---|
| 9.36 | 100 |
| 7.05 | 20 |
| 6.24 | 35 |
| 5.42 | 25 |
| 3.116 | 30 |
| 2.978 | 70 |
| 2.618 | 20 | which comprises reacting together at 50°–120° C a silica source and an alumina in a potassium-containing aqueous alkaline medium in the presence of at least one basic dye selected from the group consisting of malachite green, magenta, crystal violet, methyl violet and nuclear fast red, the molar ratio of the constituents of the mixture being represented by $SiO_2/Al_2O_3$ = 1 to 10
$K_2O/Na_2O + K_2O$ = 0.4 to 0.9
$M_2O/SiO_2$ = 0.4 to 4.0
$H_2O/M_2O$ = 10 to 50
(basic dye)/$Al_2O_3$ = 5 × $10^{-4}$ to 0.1 wherein $M_2O = K_2O + Na_2O$, to produce zeolite AG6.

* * * * *